US012573783B2

(12) United States Patent
Brekosky et al.

(10) Patent No.: US 12,573,783 B2
(45) Date of Patent: Mar. 10, 2026

(54) CONNECTOR COVER HAVING INTEGRAL TPA (TERMINAL POSITION ASSURANCE) FEATURES

(71) Applicant: TE Connectivity Solutions GmbH, Schaffhausen (CH)

(72) Inventors: Lawrence John Brekosky, Middletown, PA (US); Vinayakumar Shettar, Mechanicsburg, PA (US); Melani Cindric, Middletown, PA (US); Ramesh S, Bangalore (IN); Alexander Brong, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 319 days.

(21) Appl. No.: 18/328,808

(22) Filed: Jun. 5, 2023

(65) Prior Publication Data

US 2024/0356264 A1 Oct. 24, 2024

(51) Int. Cl.
*H01R 13/436* (2006.01)

(52) U.S. Cl.
CPC .................................. *H01R 13/436* (2013.01)

(58) Field of Classification Search
CPC .................................................... H01R 13/436
USPC ....................................................... 439/733.1
See application file for complete search history.

(56) References Cited

U.S. PATENT DOCUMENTS

| | | | | |
|---|---|---|---|---|
| 5,908,327 | A * | 6/1999 | Tsuji | H01R 24/84 439/470 |
| 11,876,331 | B2 * | 1/2024 | Huang | H01R 13/502 |
| 2010/0227511 | A1 * | 9/2010 | Qian | H01R 9/03 439/708 |
| 2018/0151972 | A1 * | 5/2018 | Balser | H01R 13/113 |
| 2018/0277977 | A1 * | 9/2018 | Rabrenovic | H01R 13/743 |

OTHER PUBLICATIONS

Unknown, "Economy Power 2.5 Connectors Quick Reference Guide," TE Connectivity, Catalog, 4 pages , 2019.

* cited by examiner

*Primary Examiner* — Timothy J Thompson
(74) *Attorney, Agent, or Firm* — Audrey Cornelius

(57) ABSTRACT

An electrical connector assembly having a housing with terminal receiving cavities. First terminal position assurance receiving slots extend into the terminal receiving cavities. First terminals are positioned in the terminal receiving cavities. A cover is positioned over the housing, the cover has first terminal position assurance members which extend therefrom. The first terminal position assurance members of the cover extend through the first terminal position assurance receiving slots into the first terminal receiving cavities to properly position and retain the first terminals in the first terminal receiving cavities.

20 Claims, 6 Drawing Sheets

CONNECTOR COVER HAVING INTEGRAL TPA (TERMINAL POSITION ASSURANCE) FEATURES

FIELD OF THE INVENTION

The subject matter herein relates generally to electrical connectors that have terminal position assurance devices or members to ensure that electrical terminals are properly loaded and secured within connector housings. In particular, the invention relates to an electrical connector with a cover having integral terminal position assurance features.

BACKGROUND OF THE INVENTION

Electrical connectors typically include electrical terminals that are held within an insulative housing. The electrical terminals have to be properly positioned or seated within the housing in order to successfully mate to a corresponding electrical contact of a mating connector. If one or more of the terminals are not properly positioned, the connector may not operate as intended when mated to the mating connector. Once a malfunction is detected, it may be difficult to determine which of the terminals is at fault due to the number of terminals in the housing and poor accessibility of the terminals within the housing. Another concern with electrical connectors is retention of the terminals. For example, some terminals are retained within a cavity of the housing via small retention features, such as latches, that extend between the terminal and the housing within the cavity. However, the retention features may not be sufficiently robust to withstand pulling forces exerted on cables attached to the terminals, causing the retention features to fail and allowing the terminals to be pulled out of position.

In order to ensure that the terminal are properly positioned and maintained in position when pulling forces are applied, terminal position assurance members have been used. Terminal position assurance member are generally a separate member which is inserted into a terminal receiving cavity after the terminal has been positioned therein. The terminal position assurance member is a locking mechanism for fixing the terminal in the proper position and for preventing the improper removal of the terminal. Known terminal positioning assurance members are separate members which are inserted into the terminal receiving cavities. While effective, having separate members can add to the complexity and cost of the electrical connector.

It would, therefore, be beneficial to provide a terminal position assurance member which is integral with the electrical connector. In particular, it would be beneficial to provide an electrical connector with a cover having integral terminal position assurance features.

SUMMARY OF THE INVENTION

An embodiment is directed to an electrical connector assembly having a housing with terminal receiving cavities. First terminal position assurance receiving slots extend into the terminal receiving cavities. First terminals are positioned in the terminal receiving cavities. A cover is positioned over the housing, the cover has first terminal position assurance members which extend therefrom. The first terminal position assurance members of the cover extend through the first terminal position assurance receiving slots into the first terminal receiving cavities to properly position and retain the first terminals in the first terminal receiving cavities.

In various embodiments, the electrical connector has second terminal position assurance member receiving slots extend from an outside surface of terminal receiving projection into second terminal receiving cavities. The cover has second terminal position assurance members which extend therefrom. The second terminal position assurance members of the cover extend through the second terminal position assurance receiving slots into the second terminal receiving cavities to properly position and retain the second terminals in the second terminal receiving cavities.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
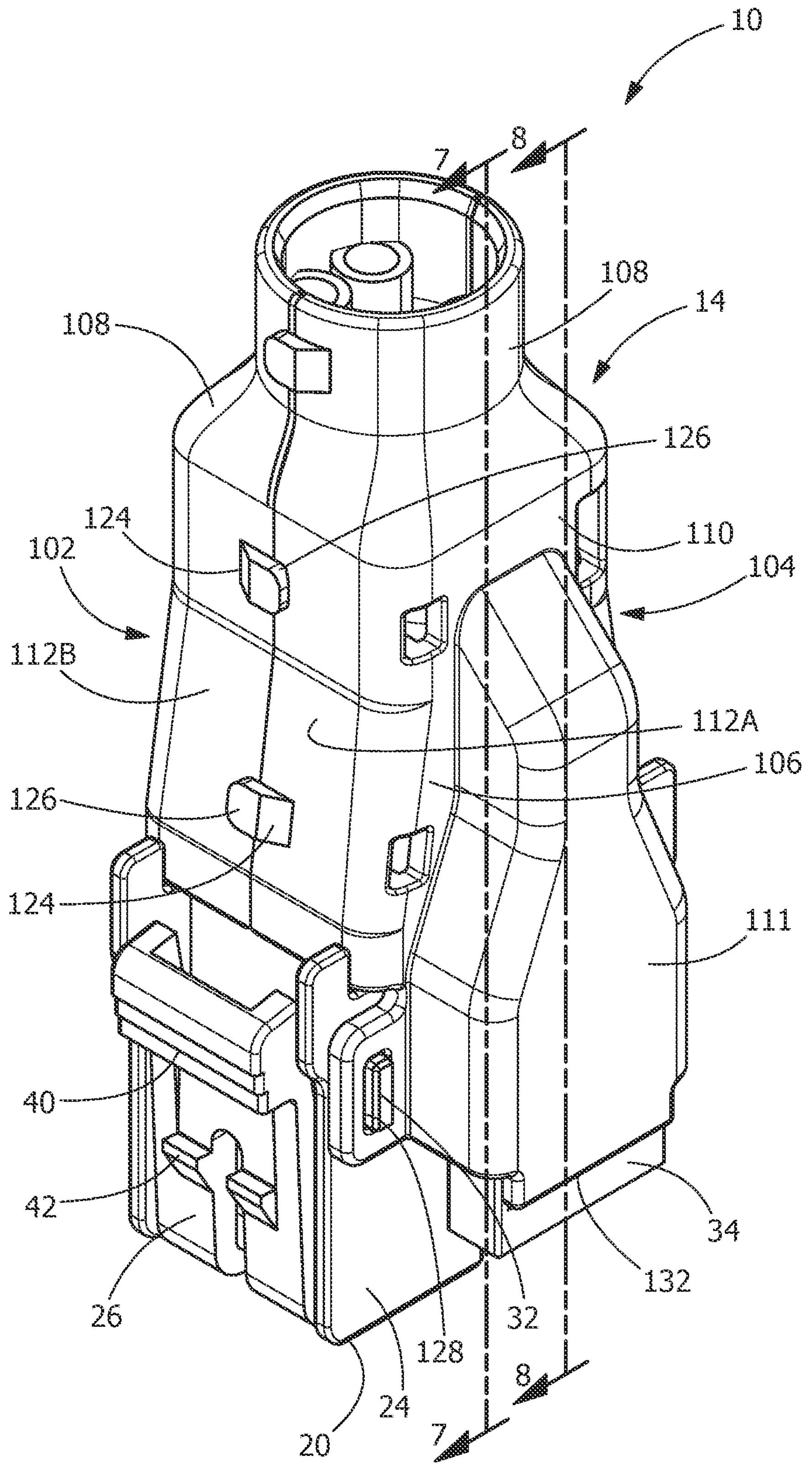
FIG. 1 is a perspective view of an illustrative electrical connector assembly of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments.

Accordingly, the invention expressly should not be limited to such embodiments illustrating some possible non-limiting combination of features that may exist alone or in other combinations of features, the scope of the invention being defined by the claims appended hereto.

Figure 2:
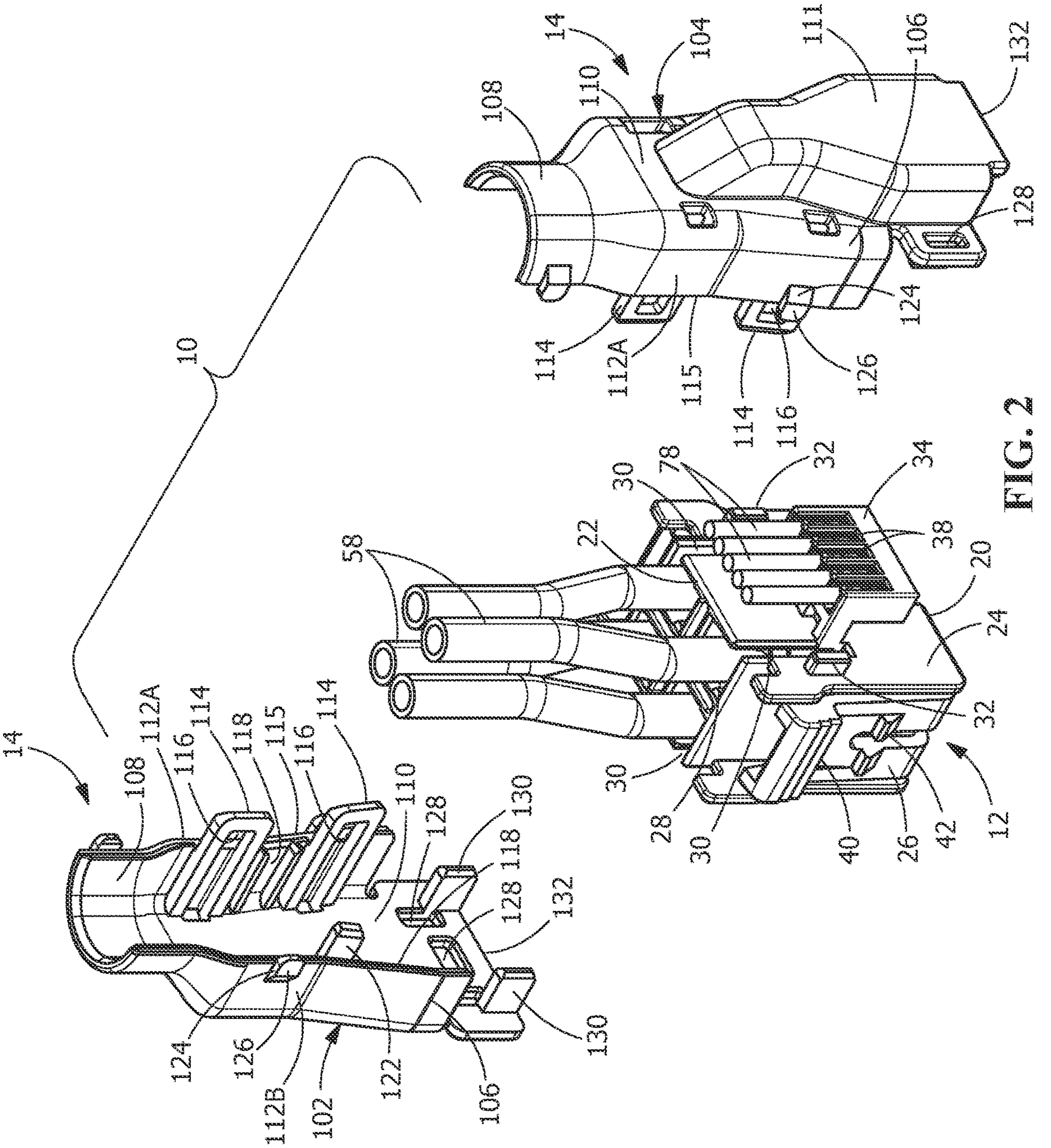
FIG. 2 is a perspective view of the electrical connector assembly of FIG. 1 with a cover exploded from the housing.

As shown in FIGS. 1 and 2, an illustrative electrical connector assembly 10 has a housing 12 and a cover assembly 14. The illustrative electrical connector assembly 10 may be mounted to a mating electrical connector (not shown).

In the illustrative embodiment shown, the housing 12 is a receptacle housing. However, the housing 12 may have other configurations, including, but not limited to, a plug housing.

Figure 4:
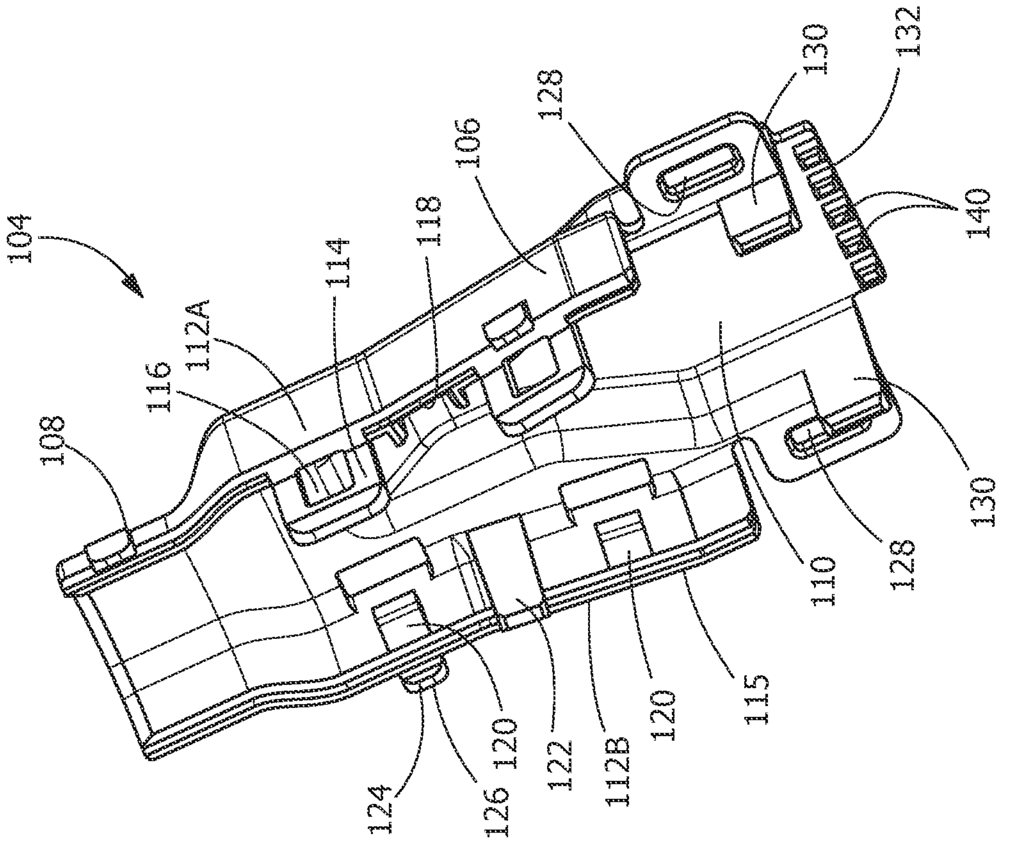
FIG. 4 is a perspective view of a cover member of the cover of the electrical connector of FIG. 1.
Figure 3:
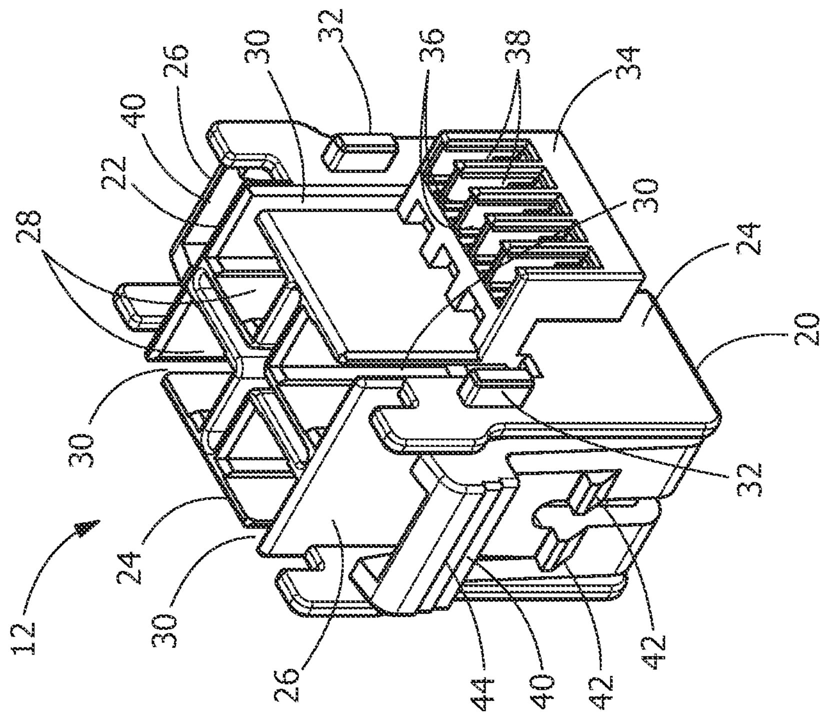
FIG. 3 is a perspective view of the housing of the electrical connector of FIG. 1.

As shown in FIGS. 2 and 4, the illustrative housing 12 has a mating face 20 and a conductor receiving face 22. Side walls 24 and end walls 26 extend between the mating face 20 and the conductor receiving face 22. The side walls 24 extend in a direction which is essentially perpendicular to the end walls 26.

Power terminal receiving cavities 28 extend between the mating face 20 and a conductor receiving face 22. In the embodiment shown, four power terminal receiving cavities 28 are provided. However, other numbers of power terminal receiving cavities 28 may be provided.

Terminal position assurance member receiving slots 30 are provided at the corners between the side walls 24 and end walls 26. The terminal position assurance member receiving slots 30 extend from the conductor receiving face 22 toward the mating face 20. The terminal position assurance member receiving slots 30 extend from an outside surface of the side walls 24 and end walls 26 into the power terminal receiving cavities 28. The positioning and size of the terminal position assurance member receiving slots 30 may vary from the illustrative embodiment.

Positioning projections 32 are provided on side walls 24. The positioning projections 32 extend from the side walls 24 in a direction away from the power terminal receiving cavities 28. In the illustrative embodiment shown, positioning projections 32 are positioned proximate to each of the terminal position assurance member receiving slots 30.

A terminal receiving projection 34 is provided on at least one side wall 24. The terminal receiving projection 34 extends from the side wall 24 in a direction away from the power terminal receiving cavities 28. The terminal receiving projection 34 has one or more signal terminal receiving cavities 36 provide therein. In the illustrative embodiment shown, the signal terminal receiving cavities 36 have longitudinal axes which extend essentially parallel to the longitudinal axes of the power terminal receiving cavities 28.

The terminal position assurance member receiving slots 38 extend from an outside surface of the terminal receiving projection 34 into the signal terminal receiving cavities 36. The positioning and size of the terminal position assurance member receiving slots 38 may vary from the illustrative embodiment.

Latches 40 are provided on the end walls 26. The latches 40 have latching projections 42 which cooperate with a mating connector (not shown) to latch the connector assembly 10 to the mating connector. A latch engagement member 44 is provided to allow an operator to move the latch 40 as needed.

Figure 5:
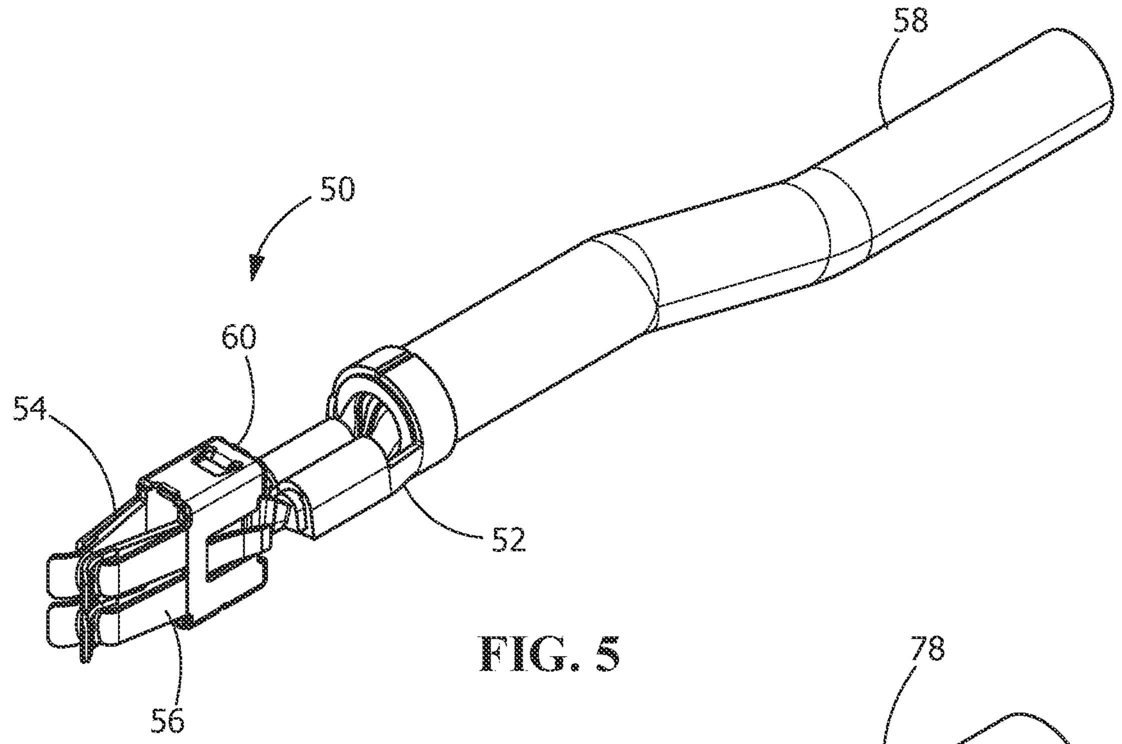
FIG. 5 is a perspective view of a first terminal of the electrical connector of FIG. 1.
Figure 7:
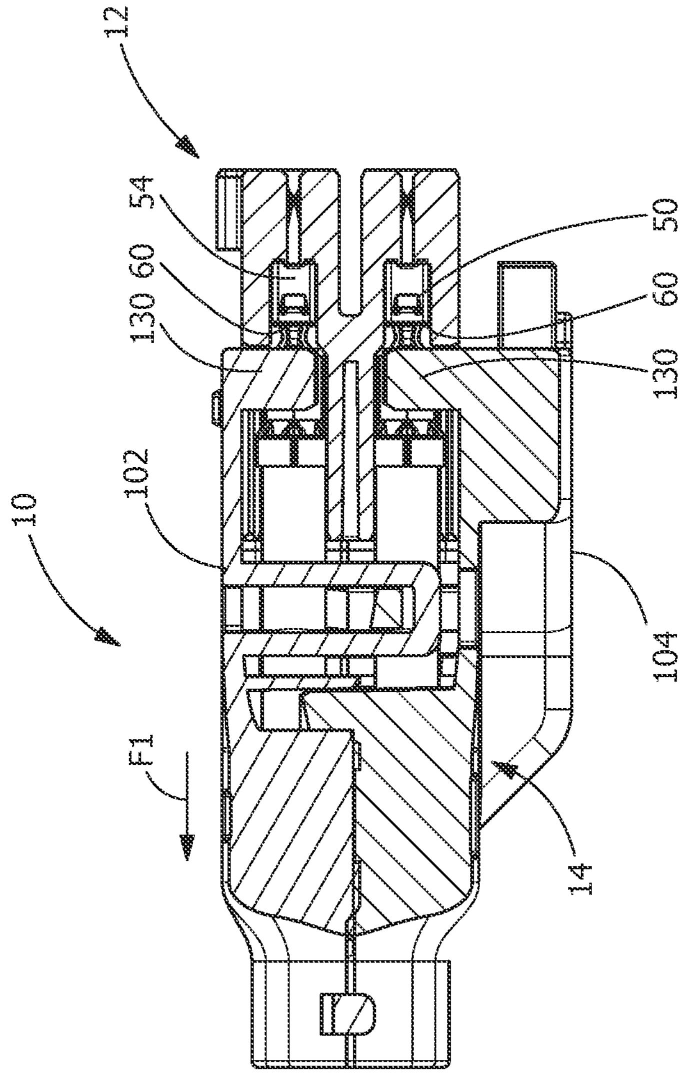
FIG. 7 is a cross-sectional view of the electrical connector assembly taken along line 7-7 of FIG. 1, showing a first terminal position member of the cover in position relative to the power terminals.
Figure 8:
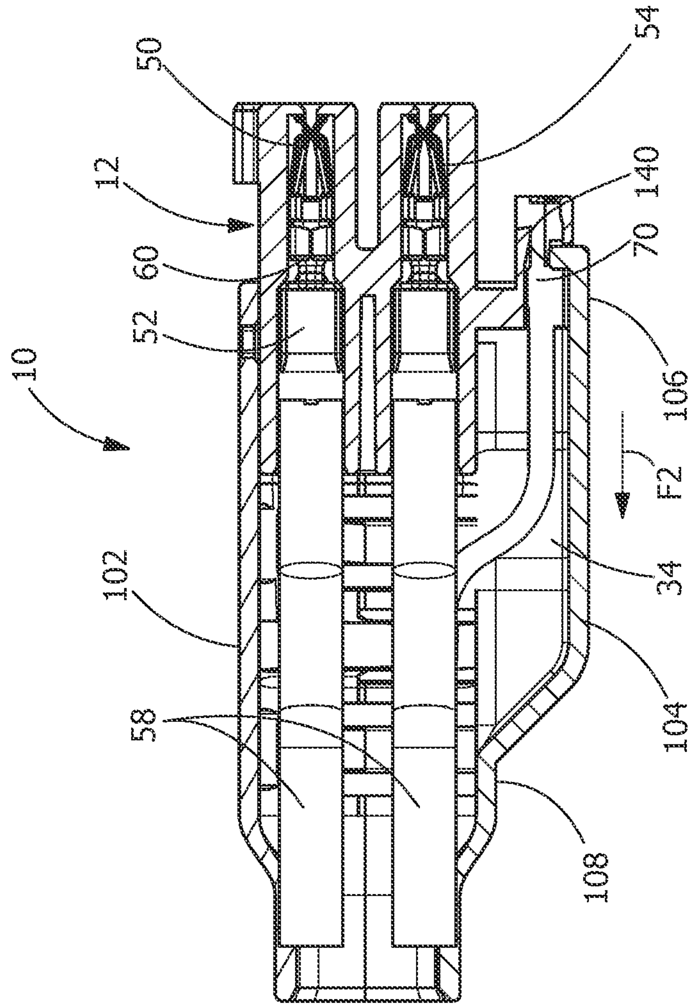
FIG. 8 is a cross-sectional view of the electrical connector assembly taken along line 8-8 of FIG. 1, showing a second terminal position member of the cover in position relative to the signal terminals.

As is shown in FIGS. 7 and 8, power terminals 50 are positioned in the power terminal receiving cavities 28. As shown in FIG. 5, the power terminals 50 have wire receiving portions 52 and mating portions 54. The mating portions 54 are configured to make a mechanical and electrical engagement with mating terminals not shown. In the illustrative embodiment shown, support members 56 are provided and cooperate with the mating portions 54 to provide increased mating force when the power terminals 50 are mated to mating terminals. The configuration of the power terminals 50 may vary. In addition, the power terminals 50 may be replaced by signal terminals in various application. Wires or cables 58 extend from the wire receiving portions 52 in a direction away from the mating portions 54.

Shoulders 60 are provided on the terminals 50. In the illustrative embodiment shown, the shoulders 60 are provided on the support members 56, but in other embodiments, the shoulders 60 may be provided on other parts of the terminals 50. The shoulders 60 extends essentially perpendicular to the longitudinal axes of the power terminal receiving cavities 28 and essentially perpendicular to the longitudinal axes of the terminals 50.

Figure 6:
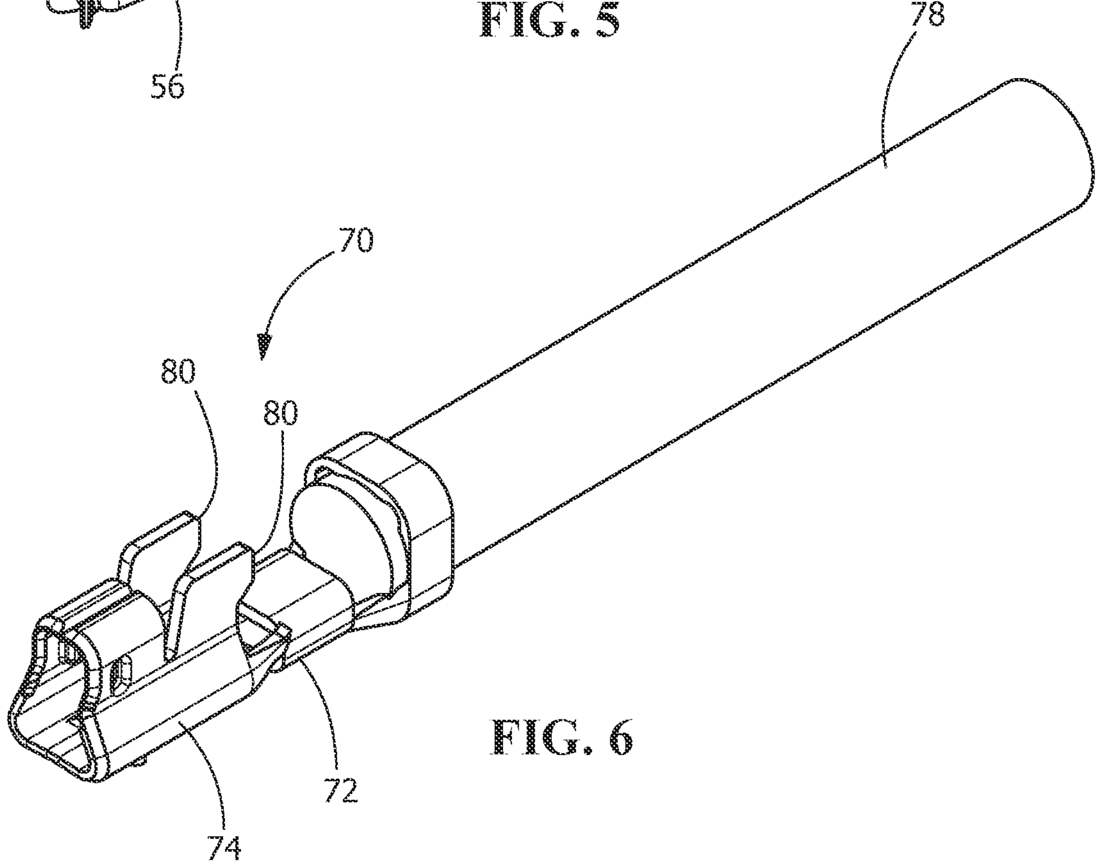
FIG. 6 is a perspective view of a second terminal of the electrical connector of FIG. 1.

As is shown in FIGS. 7 and 8, signal terminals 70 are positioned in the signal terminal receiving cavities 36. As shown in FIG. 6, the signal terminals 70 have wire receiving portions 72 and mating portions 74. The mating portions 74 are configured to make a mechanical and electrical engagement with mating terminals not shown. The configuration of the signal terminals 70 may vary. In addition, the signal terminals 70 may be replaced by power terminals in various application. Wires or cables 78 extend from the wire receiving portions 72 in a direction away from the mating portions 74.

Shoulders 80 are provided on the terminals 70. In the illustrative embodiment shown, the shoulders 80 are provided on the mating portions 74, but in other embodiments, the shoulders 80 may be provided on other parts of the terminals 70. The shoulders 80 extends essentially perpendicular to the longitudinal axes of the signal terminal receiving cavities 36 and essentially perpendicular to the longitudinal axes of the terminals 70.

As shown in FIGS. 1, 2 and 4, the illustrative cover assembly 14 has a first cover component 102 and a mating second cover component 104. Each of the components 102, 104 has a housing receiving portion 106 and a wire or cable receiving portion 108. A contoured base wall 110 and contoured side walls 112A, 112B extend from the base wall 110. In the illustrative embodiment shown, the side walls 112A, 112B extend essentially perpendicular to the base wall 110. Second cover component 104 has a terminal projection receiving area 111 provided thereon.

Resilient latching arms 114 extend from the base wall 110 to beyond edges 115 of first respective side walls 112A. The resilient latching arms 114 have latch projection receiving openings 116 provided therein. Positioning channels or grooves 118 are provided between the resilient latching arms 114.

Latch projections 120 (FIG. 4) are provided proximate edges 115 of second respective side walls 112B. The latch projections 120 are positioned in line with the resilient latching arms 114 when the first cover component 102 and the second cover component 104 are mated together. Positioning projections 122 are provide between the latch projections 120. The positioning projections 122 are positioned in line with the positioning channels or grooves 118 when the first cover component 102 and the second cover component 104 are mated together.

Stabilizing projections 124 are provided on outside surfaces of the side walls 112. Free ends 126 of the stabilizing projections extend beyond the edges 115 of side walls 112. Positioning openings 128 are provided in the base wall 110 of the cover components 102, 104. The positioning and number of positioning openings 110 may vary between cover component 102 and cover component 104. The positioning and number of stabilizing projections 124 and positioning openings 128 is meant to be illustrative and not limiting.

First terminal position assurance members 130 extend from the base wall 110. In the illustrative embodiment shown, the first terminal position assurance members 130 extend essentially perpendicular to the base wall 110 and essentially parallel to the side walls 112. The first terminal position assurance members 130 are positioned in the housing receiving portion 106 proximate to a free end 132 of the base wall 110. In the illustrative embodiment shown, each cover component 102, 104 has two first terminal position assurance members 130, but other numbers may be provided. The number of first terminal position assurance members 130 provided on both cover components 102, 104 is equal to the number of terminal receiving cavities 28.

Second terminal position assurance members 140 (FIG. 4) extend from the base wall 110. In the illustrative embodiment shown, the second terminal position assurance members 140 extend essentially perpendicular to the base wall 110 and essentially parallel to the side walls 112. The second terminal position assurance members 140 are positioned in the housing receiving portion 106 proximate to a free end 132 of the base wall 110 and proximate to the first terminal position assurance members 130. The length that the second terminal position assurance members 140 extend from the base wall 110 is less than the length the first terminal position assurance members 130 extend from the base wall 110 In the illustrative embodiment shown, second cover component 104 has five second terminal position assurance members 140, but other numbers may be provided. The number of second terminal position assurance members 140 provided on the cover components 102, 104 is equal to the number of terminal receiving cavities 36.

In use, the power terminals 50 positioned in the power terminal receiving cavities 28 and the signal terminals 70 positioned in the signal terminal receiving cavities 36, as shown in FIG. 2. The cover components 102, 104 are then moved into position over the housing 12 as shown in FIGS. 1, 7 and 8.

If the power terminals 50 are not properly positioned in the power terminal receiving cavities 28, the shoulders 60 of the power terminals 50 or other parts of the power terminals 50 will engage the first terminal position assurance members 130 as the cover members 102, 104 are inserted on the housing 12. This prevents the full insertion of the cover members 102, 104, alerting the operator that the terminals 50 are not properly positioned. Alternatively, if the terminals 50 are only slightly misaligned, the insertion of the first terminal position assurance members 130 may cause the first terminal position assurance members 130 to move the terminals 50 into position.

Similarly, if the signal terminals 70 are not properly positioned in the signal terminal receiving cavities 36, the shoulders 80 of the signal terminals 70 or other parts of the signal terminals 70 will engage the second terminal position assurance members 140 as the cover members 102, 104 are inserted on the housing 12. This prevents the full insertion of the cover members 102, 104, alerting the operator that the signal terminals 70 are not properly positioned. Alternatively, if the signal terminals 70 are only slightly misaligned, the insertion of the second terminal position assurance members 140 may cause the second terminal position assurance members 140 to move the signal terminals 70 into position.

During assembly of the cover members 102, 104 to each other and the housing 12, the positioning projections 32 of the housing 12 are inserted into the positioning openings 128 of the cover members 102, 104 to facilitate the proper positioning of the cover members 102, 104 relative to the housing 12. The cooperation of the positioning projections 32 and the positioning openings 128 also prevents axial movement and rocking of the connector members 102, 104 relative to the housing 12. The positioning projections 32 and the positioning openings 128 provide stabilization and keying to ensure proper positioning.

In addition, the positioning projections 122 of a respective cover member 102, 104 is positioned in the positioning channels 118 of the other respective cover member 102, 104 to facilitate the proper positioning of the cover member 102, 104. The cooperation of the positioning projections 122 and the positioning channels 118 restricts the unwanted separation of the cover members 102, 104. In addition the positioning projections 122 and the positioning channels 118 prevent the cover members 102, 104 from moving relative to each other.

In the assembled position, the first terminal position assurance members 130 extend through the terminal position assurance receiving slots 30 of the housing 12 and into the power terminal receiving cavities 28. As shown in FIG. 7, the first terminal position assurance members 130 are positioned proximate the shoulders 60 of the power terminals 50. In this position, the first terminal position assurance members 130 are provided in line with the shoulders 60 of the power terminals 50. Consequently, if a force F1 is applied to the wires 58 or the terminals 50, the first terminal position assurance members 130 will engage the shoulders 60 to prevent the unwanted movement of the terminals 50.

In the assembled position, the second terminal position assurance members 140 extend through the terminal position assurance receiving slots 38 of the terminal receiving projection 34 and into the signal terminal receiving cavities 36. As shown in FIG. 8, the second terminal position assurance members 140 are positioned proximate the shoulders 80 of the signal terminals 70. In this position, the second terminal position assurance members 140 are provided in line with the shoulders 80 of the signal terminals 70. Consequently, if a force F2 is applied to the wires 78 or the signal terminals 70, the second terminal position assurance members 140 will engage the shoulders 80 to prevent the unwanted movement of the signal terminals 70.

In the assembled position, the resilient latching arms 114 of a respective cover member 102, 104 engage the latch projections 120 of the other respective cover member 102, 104 to latch and retain the cover members 102, 104 in position relative to each other and relative to the housing 12. The stabilizing projections 124 of a respective cover member 102, 104 also engage the side wall 112 of the other respective cover member 102, 104 to prevent the cover members 102, 104 from moving side to side relative to each other.

In other illustrative embodiments the cover assembly 14 may have different configurations. Such configurations, include, but are not limited to, having one or more cover members which are attached to the housing with a hinge member allowing the cover members to be rotated to the closed or locked position in which the terminal position assurance members are properly positioned in the terminal receiving cavities.

The invention integrates the terminal position assurance members, for one or both of the power and signal terminals, directly onto the connector cover members. As the cover members are assembled onto the connector housing, the terminal position assurance members positioned in slots and the terminal receiving cavities where the terminals reside, allowing the terminal position assurance members to provide additional terminal retention. If the covers cannot be assembled properly, the operator is alerted to verify that the terminals are fully inserted. By positioning the terminal position assurance members on the cover, additional individual terminal position assurance components are not needed, thereby simplifying the assembly operation for the operator.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector assembly comprising:

a housing with terminal receiving cavities, first terminal position assurance receiving slots extending into the terminal receiving cavities;

first terminals positioned in the terminal receiving cavities, the first terminals having first shoulders;

a cover positioned over the housing, the cover having first terminal position assurance members extending therefrom;

wherein the first terminal position assurance members of the cover extend through the first terminal position assurance receiving slots into the first terminal receiving cavities to properly position and retain the first terminals in the first terminal receiving cavities;

wherein the first terminal position assurance members will engage the first terminals if the first terminals are not properly positioned in the terminal receiving cavities, preventing the full insertion of the cover over the housing.

2. The electrical connector as recited in claim 1, wherein the first terminal position assurance member receiving slots extend from outside surfaces of side walls of the housing into the first terminal receiving cavities.

3. The electrical connector as recited in claim 1, wherein positioning projections extend from side walls of the housing in a direction away from the first terminal receiving cavities.

4. The electrical connector as recited in claim 1, wherein a terminal receiving projection is provided on at least one side wall of the housing, the terminal receiving projection extends from the at least one side wall in a direction away from the first terminal receiving cavities.

5. The electrical connector as recited in claim 4, wherein the terminal receiving projection has one or more second terminal receiving cavities provide therein.

6. The electrical connector as recited in claim 5, wherein second terminal position assurance member receiving slots extend from an outside surface of the terminal receiving projection into the second terminal receiving cavities.

7. The electrical connector as recited in claim 6, wherein the cover has second terminal position assurance members extending therefrom, wherein the second terminal position assurance members of the cover extend through the second terminal position assurance receiving slots into the second terminal receiving cavities to properly position and retain the second terminals in the second terminal receiving cavities.

8. The electrical connector as recited in claim 1, wherein the first terminals have first wire receiving portions and first mating portions, the first shoulders are provided between the first wire receiving portions and the first mating portions.

9. The electrical connector as recited in claim 8, wherein the first shoulders extends essentially perpendicular to a longitudinal axes of the first terminal receiving cavities and essentially perpendicular to a longitudinal axes of the first terminals.

10. The electrical connector as recited in claim 7, wherein second terminals are positioned in the second terminal receiving cavities, the second terminals have second wire receiving portions and second mating portions, second shoulders are provided between the second wire receiving portions and the second mating portions.

11. The electrical connector as recited in claim 10, wherein the second shoulders extends essentially perpendicular to a longitudinal axes of the second terminal receiving cavities and essentially perpendicular to a longitudinal axes of the second terminals.

12. The electrical connector as recited in claim 1, wherein the cover has a first cover component and a mating second cover component, the first and second cover components have a housing receiving portion and a wire receiving portion, the first and second cover components have base walls and side walls which extend from the base walls.

13. The electrical connector as recited in claim 12, wherein resilient latching arms extend from the base walls to beyond edges of first respective side walls of the side walls, the resilient latching arms have latch projection receiving openings.

14. An electrical connector assembly comprising:

a housing with terminal receiving cavities, first terminal position assurance receiving slots extending into the terminal receiving cavities;

first terminals positioned in the terminal receiving cavities;

a cover positioned over the housing, the cover having first terminal position assurance members extending therefrom, positioning channels are provided between resilient latching arms of the cover;

wherein the first terminal position assurance members of the cover extend through the first terminal position assurance receiving slots into the first terminal receiving cavities to properly position and retain the first terminals in the first terminal receiving cavities.

15. The electrical connector as recited in claim 14, wherein latch projections are provided proximate edges of second respective side walls of the side walls, the latch projections are positioned in line with the resilient latching arms when the first cover component and the second cover component are mated together.

16. The electrical connector as recited in claim 15, wherein positioning projections are provide between the latch projections, the positioning projections are positioned in line with the positioning channels when the first cover component and the second cover component are mated together.

17. The electrical connector as recited in claim 16, wherein stabilizing projections are provided on outside surfaces of the side walls, free ends of the stabilizing projections extend beyond the edges of side walls.

18. The electrical connector as recited in claim 17, wherein positioning openings are provided in the base walls of the first and second cover components.

19. The electrical connector as recited in claim 7, wherein the first terminal position assurance members extend essentially perpendicular to base walls of the cover and the second terminal position assurance members extend essentially perpendicular to base walls of the cover.

20. An electrical connector assembly comprising:

a housing with first terminal receiving cavities and second terminal receiving cavities, first terminal position assurance receiving slots extending into the first terminal receiving cavities and second terminal position assurance receiving slots extending into the second terminal receiving cavities;

first terminals positioned in the first terminal receiving cavities;

second terminals positioned in the second terminal receiving cavities;

a cover positioned over the housing, the cover having first terminal position assurance members and second terminal position assurance members extending therefrom, a length that the second terminal position assurance members extend from a base wall of the cover is less than a length the first terminal position assurance members extend from the base wall.

* * * * *